US012367622B2

(12) United States Patent
Zhu et al.

(10) Patent No.: US 12,367,622 B2
(45) Date of Patent: Jul. 22, 2025

(54) MULTI-TASK LEARNING BASED REGIONS-OF-INTEREST ENHANCEMENT IN PET IMAGE RECONSTRUCTION

(71) Applicant: ZHEJIANG LAB, Zhejiang (CN)

(72) Inventors: Wentao Zhu, Hangzhou (CN); Bao Yang, Hangzhou (CN); Yuanfeng Wu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 355 days.

(21) Appl. No.: 18/087,743

(22) Filed: Dec. 22, 2022

(65) Prior Publication Data

US 2023/0127939 A1  Apr. 27, 2023

Related U.S. Application Data

(63) Continuation of application No. PCT/CN2022/074409, filed on Jan. 27, 2022.

(30) Foreign Application Priority Data

Jun. 30, 2021  (CN) .......................... 202110732417.7

(51) Int. Cl.
*G06T 11/00* (2006.01)
*G06T 5/70* (2024.01)
*G06T 9/00* (2006.01)

(52) U.S. Cl.
CPC .............. *G06T 11/008* (2013.01); *G06T 5/70* (2024.01); *G06T 9/002* (2013.01); *G06T 11/006* (2013.01);
(Continued)

(58) Field of Classification Search
CPC ................... G06T 11/008; G06T 9/002; G06T 2207/10104; G06T 2207/20081;
(Continued)

(56) References Cited

U.S. PATENT DOCUMENTS 8,837,860 B1  9/2014 Grady et al.
2018/0249979 A1*  9/2018 Wang ..................... A61B 5/055
(Continued)

FOREIGN PATENT DOCUMENTS

CN  109559360 A  4/2019
CN  111325686 A  6/2020
(Continued)

OTHER PUBLICATIONS

International Search Report (PCT/CN2022/074409); Date of Mailing: Mar. 9, 2022.
(Continued)

*Primary Examiner* — Emily C Terrell
*Assistant Examiner* — Amanda H Pearson
(74) *Attorney, Agent, or Firm* — Wiersch Law Group

(57) ABSTRACT

Disclosed is a method for region-of-interest enhanced PET image reconstruction based on multi-task learning, which comprises the following steps: firstly, acquiring a backprojection image of the PET original data, and designing a main task of establishing a mapping between the backprojection image and a reconstructed PET image by using a three-dimensional deep convolution neural network. A new auxiliary task 1 is designed to predict a computerized tomography (CT) image with the same anatomical structures as the PET image reconstructed from the backprojection image, so as to reduce the noise in the reconstructed PET image by using the local smoothing information of the high-resolution CT image.

4 Claims, 2 Drawing Sheets

(52) U.S. Cl.
CPC ............... *G06T 2207/10104* (2013.01); *G06T 2207/20081* (2013.01); *G06T 2207/20084* (2013.01); *G06T 2211/424* (2013.01)

(58) Field of Classification Search
CPC ............ G06T 2207/20084; G06T 5/60; G06T 2207/10081; G06T 2207/20056; G06T 2211/441
See application file for complete search history.

(56) References Cited

U.S. PATENT DOCUMENTS

| | | | |
|---|---|---|---|
| 2021/0290076 A1* | 9/2021 | Siemionow | ............... G06T 7/12 |
| 2022/0284643 A1* | 9/2022 | Jha | ........................ G06T 11/005 |

FOREIGN PATENT DOCUMENTS

| | | | |
|---|---|---|---|
| CN | 111627082 A | | 9/2020 |
| CN | 112258642 A | | 1/2021 |
| CN | 113256753 A | | 8/2021 |
| EP | 3576049 A2 | | 12/2019 |
| WO | 2021041772 A1 | | 3/2021 |

OTHER PUBLICATIONS

CN First Office Action(202110732417.7); Date of Mailing: Aug. 25, 2021.

* cited by examiner

MULTI-TASK LEARNING BASED REGIONS-OF-INTEREST ENHANCEMENT IN PET IMAGE RECONSTRUCTION

CROSS-REFERENCE TO RELATED APPLICATIONS

The present application is a continuation of International Application No. PCT/CN2022/074409, filed on Jan. 27, 2022, which claims priority to Chinese Application No. 202110732417.7, filed on Jun. 30, 2021, the contents of both of which are incorporated herein by reference in their entireties.

TECHNICAL FIELD

The present disclosure belongs to the technical field of medical imaging, and specifically relates to a method for enhancing regions-of-interest in PET imaging based on multi-task learning.

BACKGROUND

Positron Emission Tomography (PET) is a molecular imaging technique that provides measurements of the metabolic and functional processes of human or animal bodies. PET imaging has been widely used in tumor diagnosis, diagnosis and treatment evaluation of neuropsychiatric diseases and cardiovascular diseases. The PET imaging process can be described as follows. The radiopharmaceutical is generated and injected into a patient. The radiotracer redistributes itself within the body while isotopes emit positrons during radioactive decay. When a positron collides with an electron it gives rise to photons which are emitted simultaneously and travels in opposite directions along a straight-line path. If the two photons are simultaneously detected by two small detectors in the PET scanner, the annihilation must have occurred along the line corresponding to the two detectors and the line is referred to as the line of response (LOR). Collecting the LORs from various positions and angles, we obtain three-dimensional (3D) raw PET data, from which a 3D PET image is generated by a reconstruction algorithm to represent the radiotracer distribution in human body.

The classical analytical reconstruction algorithm is based on a line integral model, in which the original PET data is backprojected to the image domain along LORs to obtain a blurred PET image, followed by a 3D high-pass filter to sharpen the edges and details in the backprojection image to obtain a clear PET image. Because the high-pass filter inevitably enhances high-frequency noise while enhancing high-frequency signals, an image reconstructed by an analytical algorithm has high noise, especially reconstructing insufficient raw data. Different from analytical algorithms, iterative reconstruction algorithms which are widely used in clinics nowadays model the original data as independent Poisson processes, and obtain unbiased estimation of PET images by solving the maximum likelihood estimation of the original data. Because the noise is accurately modeled in the data domain, the noise in PET images obtained by the iterative reconstruction algorithm is much lower than that of the analytical reconstruction algorithm. However, repeating the forward and backward projections in the iterative reconstruction algorithm make it time-consuming, which is one of the disadvantages that need to be overcome in iterative PET image reconstruction.

With the upgrading of computer hardware and the rapid development of deep learning technology, in recent years, the topic of improving PET image reconstruction by deep learning has been widely concerned. Among them, efforts have been made in establishing the end-to-end mapping between low quality PET images and high-quality PET images by deep learning or directly establishing the mapping between PET raw data and PET images. While shortening the iterative reconstruction time, deep-learning based reconstruction obtains PET images with high resolution and low noise. However, most of current learning-based reconstruction algorithms are based on single task learning, in which prior knowledge about PET images cannot be introduced into the reconstruction mapping as well as the attention to the regions of interest (ROIs) in a PET image. In addition, the trained model has poor generalizability such that artifacts exist when applying the models to reconstruct new data. Therefore, the reconstruction method based on deep learning has not been used in clinical applications.

SUMMARY

To overcome the shortcomings of the existing single-task learning based PET reconstruction technologies, the present disclosure provides a multi-task learning based PET image reconstruction method which can enhence ROIs during reconstruction. Specifically, the backprojection image of PET raw data is obtained, and the main reconstruction task is designed to establish the mapping between the backprojection image and the PET image reconstructed by using a 3D deep convolutional neural network (CNN). A new auxiliary task 1 is designed to predict a computerized tomography (CT) image with the same anatomical structures as the PET image reconstructed from the backprojection image. The auxiliary task 1 can reduce the noise in the reconstructed PET image by using the structural information of uniform regions of the high-resolution CT image. A new auxiliary task 2 is designed to distinguish a ROI from the background region in the backprojection image, enhancing the reconstruction of the ROIs and reducing the quantitative error caused by noise reduction.

The present disclosure is realized by the following technical solution:

The present disclosure relates to a method for ROIs enhancement in PET image reconstruction based on multi-task learning. The method performs PET image reconstruction by feeding a backprojection image into a trained CNN based reconstruction mapping to obtain a reconstructed PET image. The reconstruction mapping includes a shared encoder and a reconstruction decoder, which is learned through the following training steps:

Step (1) generates a training dataset, each sample of the training dataset includes a PET backprojection image, a reconstructed PET image, a CT image obtained by CT scanning before PET scanning, and a mask of ROIs; the ROI is a region with specific position and shape characteristics in the reconstructed PET image;

Step (2) performs shared encoder based multi-task learning, which at least includes:

A main task of PET reconstruction: taking the backprojection image as an input of the shared encoder, the mapping from the backprojection image to the reconstructed image is learned according to the reconstruction loss between the output of the reconstruction decoder and the reference PET reconstruction.

A new task 1: taking the PET backprojection image as the input of the shared encoder, the mapping from the PET backprojection image to the CT image is learned minimizing the prediction loss between an output of a CT prediction decoder and the reference CT image.

A new task 2: taking the PET backprojection image as the input of the shared encoder, the mapping from the PET backprojection image to the mask of the ROIs is learned by minimizing the difference between an output of a segmentation decoder and the label of the mask.

Step (3) uses the training dataset generated in step (1) to perform training by minimizing a multi-task loss. A trained reconstruction mapping based on CNN is obtained.

Further, in the step (1), the PET backprojection image is obtained by performing attention, random, and scatter correction on the original PET data and projecting the corrected data into the image domain.

Further, in the step (1), the reconstructed PET image is obtained by iteratively reconstructing the corrected PET data.

Further, the reconstruction mapping is composed of two parts, a first part is a U-Net composed of 3D convolutional layers, 3D deconvolutional layers, and shortcuts therebetween. A second part is composed of a series of residual blocks. The 3D convolutional layers are used as the shared encoder to encode the PET backprojection image and extract high-level features; the 3D deconvolutional layer and the residual blocks are used to decode the high-level features to obtain the reconstructed PET image.

Further, the training loss of the multi-task learning in step (3) include:

A L1 norm error between the reconstructed PET image predicted by the main reconstruction task and a PET image label.

A L1 norm error between the CT images predicted in the new task 1 and a CT image label.

A Focal loss between the ROIs' mask predicted in the new task 2 and the ROIs' mask label.

A structural similarity loss between the reconstructed PET image and the predicted CT image is calculated with structural similarity index measurement (SSIM).

A L2 norm error of the contrasts between ROIs and the background region in the estimated PET image and its label is obtained by applying the predicted ROIs mask to them.

Compared with the existing technologies of PET image reconstruction, the present disclosure has the advantages that the reconstruction process provided by the present disclosure only includes one backprojection operation and one operation of testing the reconstruction network. The reconstruction time is reduced by at least half compared with the traditional iterative reconstruction algorithms. In addition, the present disclosure takes the iteratively reconstructed PET image as the label of the reconstruction mapping, and introduces the structural information of the CT image and the position information of the ROIs, so that the reconstructed PET image has the advantages of lower noise and more accurate quantification in the ROIs compared with the image reconstructed by iterative algorithms. Moreover, the reconstruction model trained by using multi-task learning generalizes better than using the existing single-task learning, and the appearance of reconstruction artifacts are avoided by multi-task learning as well.

DESCRIPTION OF EMBODIMENTS

Figure 1:
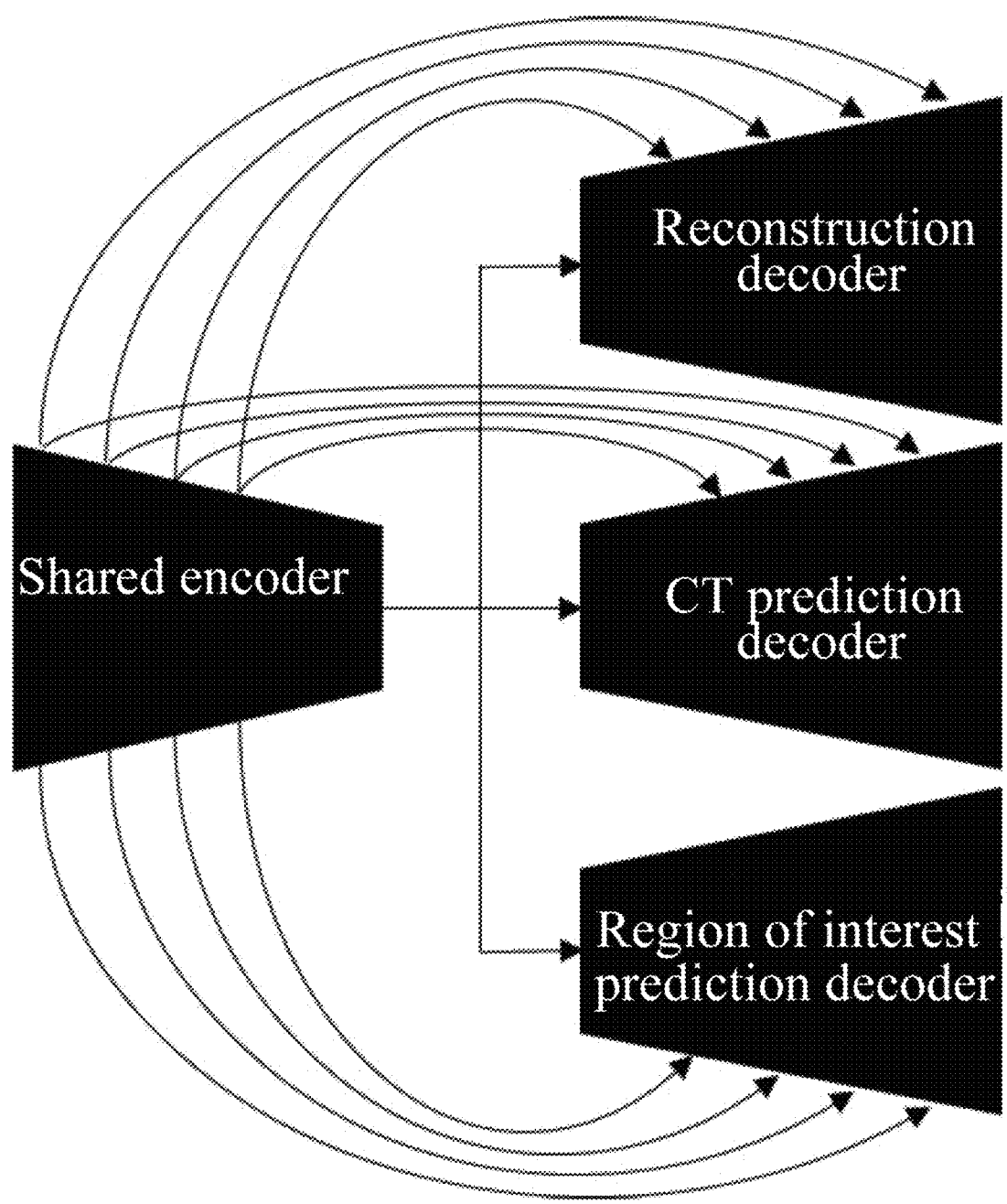
FIG. 1 is a structural schematic diagram of the training of a ROI enhanced reconstruction network based on multi-task learning according to the present disclosure.

The present disclosure provides a method for ROIs enhancement in PET image reconstruction based on multi-task learning. This method only needs to perform one back projection operation and one reconstruction network test operation, and the reconstruction time is reduced by at least half compared with the traditional iterative reconstruction algorithm. Different from the existing single-task network reconstruction methods, this method introduces the local smoothing information of CT images in the reconstruction process by adding the task of predicting CT images, and enhances the reconstruction of the ROI in the reconstruction process by adding the task of predicting the ROI mask, and finally obtains the reconstructed PET image with lower noise, higher accuracy of the ROI without artifacts.

Specifically, this method first completes the mapping from a PET backprojection image to a reconstructed PET image by training a reconstruction mapping network, and specifically includes the following steps:

(1) Generating a training data set, each sample of the training data set includes a PET backprojection image, a reconstructed PET image, a CT image obtained by a CT scan before the PET scan, and a mask of ROIs; the following specific sub-steps are included:

(1.1) PET original data is back-projected to the image domain after attenuation, random and scatter correction to obtain a blurred backprojection image b(x,y,z) containing the original data information.

(1.2) PET raw data after physical correction is subjected to iterative reconstruction to obtain a reconstructed PET image f (x,y,z); the reconstructed PET image obtained by iterative reconstruction has the following relationship with the blurred backprojection image obtained in step (1.1):

$$f(x,y,z)=b(x,y,z)*\{F_3^{-1}[G^{-1}(s_{zr})]*F_3^{-1}[H_{c1}^{-1}(s_{zr})]*F_3^{-1}[H_{c2}^{-1}(s_{zr})]\} \quad (1)$$

where f (x,y,z) and b(x,y,z) respectively represent the activity values at a certain point (x,y,z) on the three-dimensional reconstructed PET image and the blurred PET backprojection image; $G^{-1}(s_{zr})$ represents the inverse of a point spread function, $H_{c1}^{-1}(s_{zr})$ is the inverse of a blurring function caused by physical effects in image domain, such as positron range and $H_{c2}^{-1}(s_{zr})$ is the inverse of the blurring function caused by physical effects in data domain, such as transistor penetration; $s_{zr}=(s_{zr},\phi,\theta)$ is the spherical coordinate in the frequency domain, $s_{zr}$ is the radial distance, $\phi,\theta$ represent the azimuthal and polar angle respectively, and $F_3^{-1}[\cdot]$ is the inverse of the three-dimensional Fourier transform.

The present disclosure proposes to fit the mapping of the PET backprojection image b(x,y,z) to the reconstructed PET image (x,y,z) by using a neural network with convolution layers connected in series, that is, the convolution of multiple inverse blurring functions in formula (1). Specifically, the reconstruction mapping network is composed of two parts. The first part is a U-Net composed of 3D convolution layers, 3D deconvolution layers, and shortcuts between them. The second part is composed of a plurality of residual blocks connected in series. Among them, the 3D convolution layers are used as a shared encoder to encode the PET backprojection image and extract high-level features. The 3D deconvolution layers and a plurality of residual blocks form a reconstruction decoder, and the deconvolution layer encodes the features to obtain a rough estimation of the PET image. The shortcuts in the network superimpose the output of the convolution layers with that of the corresponding deconvolution layers, thus improving the network training efficiency and effectively preventing the vanishing gradient problem without increasing the network parameters. Multiple residual blocks are used to further refine the high-frequency details in the rough estimation of PET image. Because the low-frequency information contained in the rough estimation of the PET image is similar to that of the standard dose PET image, the residual blocks can only learn the high-frequency residual part between them, so as to improve the network training efficiency.

Further, since the convolution operation is linear, while the inverse blurring functions to fit are nonlinear and have spatial variability, the present disclosure makes the mapping network nonlinear by adding nonlinear activation functions such as ReLU between convolution layers, and reduces the size of the feature maps, which are the output of the convolution layers, by increasing the convolution step size, thus increasing the receptive field of voxels in the feature maps, thereby enhancing the global nature of the features learned by the mapping network and improving the local invariance of the single-layer convolution.

In this embodiment, the step size of the three-dimensional convolution layer is (2, 2, 2), but it is not limited thereto.

(1.3) The CT image obtained by the CT scan performed before the PET scan is obtained as the label of the new learning task 1.

(1.4) The ROI mask is sketched for the reconstructed PET image acquired in step (1.2), to obtain the ROI mask as a learning label of the new task 2. Wherein, the ROI refers to the region with obvious specific position and shape characteristics in the reconstructed PET image, such as the tumor region or specific organs (such as heart and lung).

(2) Performing shared encoding based multi-task learning, which specifically includes:

Main reconstruction task: taking the PET backprojection image as the input of the shared encoder, and learning the mapping from the PET backprojection image to the reconstructed PET image by using the output of the reconstruction decoder.

With the PET backprojection image obtained in step (1.1) as input and the label image obtained in step (1.3) as a prediction target, the new task 1 can be established using the same shared encoder as in step (1.2) combined with a CT prediction decoder to learn the mapping from the PET backprojection image to the CT image; with the PET backprojection image obtained in step (1.1) as input and the label image obtained in step (1.4) as a prediction target, a new task 2 is established using the same shared encoder as in step (1.2) combined with an ROI prediction decoder to learn the mapping from the PET backprojection image to the ROI mask in the reconstructed PET image; by combining the PET image reconstruction mapping described in step (1.2) with the above CT image prediction mapping and ROI mask prediction mapping through a shared encoder, the multi-task learning based ROI enhanced reconstruction network provided by the present disclosure can be obtained. The shared encoder makes the features acquired by realizing new tasks also affect the reconstruction task, that is, the prior knowledge of new tasks is introduced into the main reconstruction task. As shown in FIG. 1, the network structure is composed of a shared encoder, a reconstruction decoder, a CT prediction decoder and an ROI segmentation decoder. The network structures of the CT prediction decoder and ROI segmentation decoder are the same as that of the reconstruction decoder.

(3) Using the training dataset generated in step (1), the loss function of the multi-task reconstruction network in the present disclosure is minimized by a gradient optimization algorithm. A trained reconstruction mapping based on CNN is obtained. The loss function of the network consists of five parts:

1. A L1 norm error between the reconstructed PET image predicted by the main reconstruction task and a PET image label in the main reconstruction task.

2. A L1 norm error between the CT image predicted in the new task 1 and a CT image label in the new task 1.

3. A Focal loss between the ROIs' mask predicted in the new task 2 and a ROIs' mask label in the new task 2.

4. A structural similarity loss between the reconstructed PET image and the predicted CT is calculated with structural similarity index measurement (SSIM).

5. A L2 norm error of the contrasts between ROIs and the background region of the PET image estimation and its label is obtained by applying the predicted RIOs' mask to them.

After the network training is completed, the original PET data to reconstruct is subjected to attenuation, random and scatter correction, and is back-projected to the image domain to obtain the PET backprojection image to reconstruct.

The PET backprojection image to reconstruct is fed into the reconstruction mapping network, and after the calculation with the network weights, the reconstructed PET image with ROI enhanced by the local smoothing prior information from the CT image can be obtained.

Figure 2:
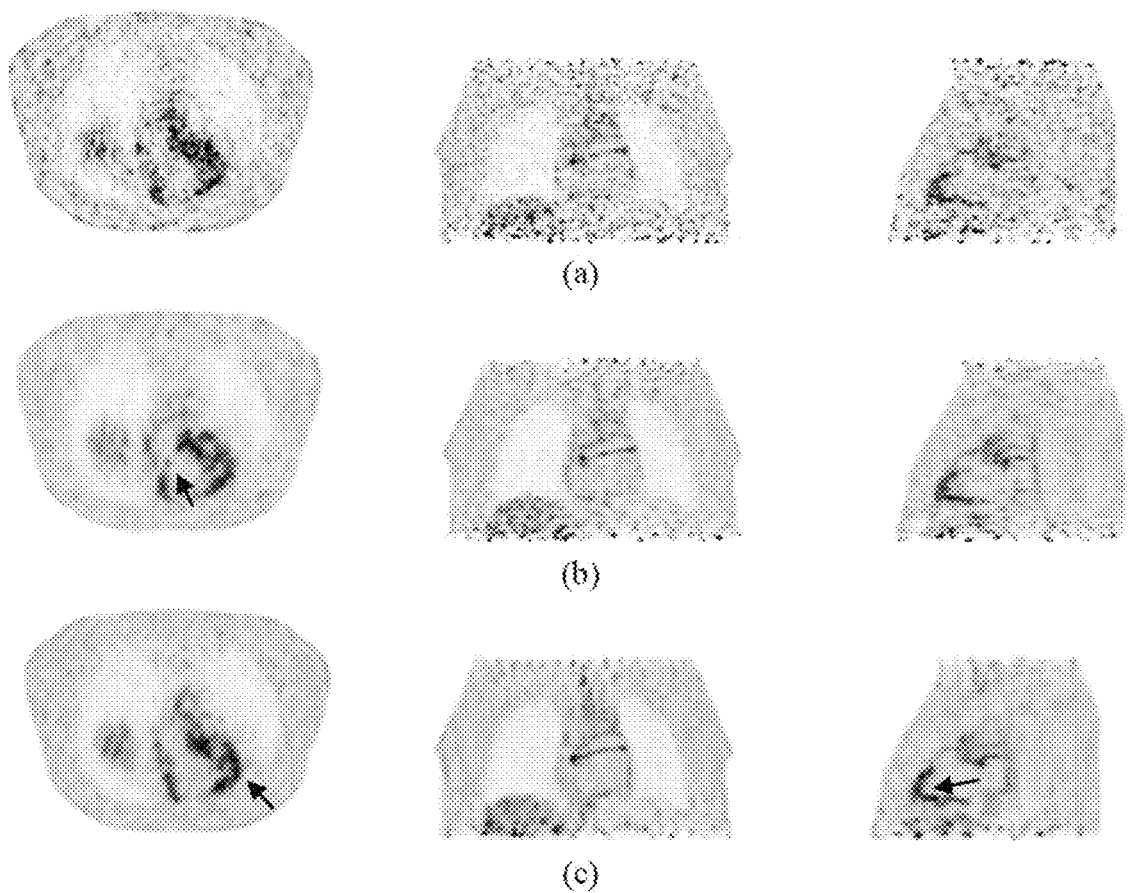
FIG. 2 is a comparison diagram of three reconstruction results of (a) iterative reconstruction algorithm, (b) reconstruction method based on single-task learning and (c) ROI enhanced reconstruction method based on multi-task learning according to the present disclosure.

For the reconstruction of whole body PET image of a patient, the reconstruction result of the iterative reconstruction algorithm is shown in FIG. 2 (a). The iterative reconstruction process includes multiple projection and back projection operations, which takes a long time and makes the reconstructed image noisy. The diagnosis of lesions is seriously disturbed by noise; the result of network reconstruction obtained by using the reconstruction mapping network of the present disclosure with single-task learning is shown in FIG. 2 (b), and the noise in the reconstructed PET image is reduced, but due to the lack of generalization ability, reconstruction artifacts are generated as shown by arrows; by using the ROI enhanced reconstruction method based on multi-task learning proposed by the present disclosure, a reconstructed PET image as shown in FIG. 2 (c) can be obtained. Compared with the single-task result, the noise in the image is further reduced, the contrast of the ROI (the heart region shown by the arrow) is higher, and no reconstruction artifacts are generated. In addition, the multi-task reconstruction provided by the present disclosure only needs one back projection operation, and the total reconstruction time is reduced by more than half compared with the iterative reconstruction method, so that the method of the present disclosure is more in line with the real-time requirement of clinical imaging.

Obviously, the above embodiments are only examples for clear explanation, and are not limitations on the implementation. For those skilled in the art, other different forms of changes or variations can be made on the basis of the above description. It is not necessary and impossible to exhaust all the embodiments here. Any obvious changes or variations derived therefrom are still within the scope of protection of the present disclosure.

What is claimed is:

1. A method for region of interest (ROI) enhanced Positron Emission Tomography (PET) image reconstruction based on multi-task learning, wherein the method completes reconstruction by feeding a PET backprojection image to reconstruct into a trained reconstruction mapping network to obtain a reconstructed PET image, wherein the reconstruction mapping network comprises a shared encoder and a reconstruction decoder, and is obtained by:

(1) constructing a training data set, wherein each sample of the training data set comprises a corresponding PET backprojection image, a reconstructed PET image, a computerized tomography (CT) image obtained by the CT scan before the PET scan, and a ROI mask in the reconstructed PET image; the ROI is a region with specific position and shape characteristics in the reconstructed PET image;

(2) establishing multi-task learning of the shared encoder, wherein the multi-task learning at least comprises:

a main reconstruction task: taking the PET backprojection image as an input of the shared encoder, and learning the mapping from the PET backprojection image to the reconstructed PET image by using an output of the reconstruction decoder;

a new task 1: taking the PET backprojection image as the input of the shared encoder, and learning the mapping from the PET backprojection image to the CT image by using an output of a CT prediction decoder;

a new task 2: taking the PET backprojection image as the input of the shared encoder, and learning the mapping from the PET backprojection image to the mask of the ROIs in the reconstructed PET image by using an output of an ROI prediction decoder;

(3) using the training data set constructed in step (1) to carry out training with a goal of minimizing losses of multi-task learning prediction results and the corresponding truth values, and obtaining a trained reconstructed mapping network;

the losses of the multi-task learning prediction results and the corresponding true values comprise:

a L1 norm error between the reconstructed PET image predicted by the main reconstruction task and a reconstructed PET image label;

a L1 norm error between the CT image predicted in the new task 1 and a CT image label;

a Focal loss between the ROI mask predicted in the new task 2 and a ROI mask label;

a similarity between the reconstructed PET image and the CT image predicted in the new task 1 by the calculation of structural similarity index measurement (SSIM); a L2 norm error between the contrasts of ROIs and a background area of the predicted PET image and the PET image label after applying the ROI mask predicted in the new task 2 thereto.

2. The method according to claim 1, wherein in the step (1), the PET backprojection image is obtained by backprojecting an original PET data into an image domain after attenuation, random and scatter correction.

3. The method according to claim 1, wherein in the step (1), the reconstructed PET image is obtained by iteratively reconstructing an original PET data after physical correction.

4. The method according to claim 1, wherein the reconstruction mapping network is composed of two parts, of which a first part is a U-Net composed of 3D convolution layers, 3D deconvolution layers, and shortcuts therebetween, and a second part is composed of a plurality of residual blocks connected in series; wherein the 3D convolution layers are used as the shared encoder to encode the PET backprojection image and extract high-level features, and the 3D deconvolution layers and the plurality of residual blocks form the reconstruction decoder, which is used to decode the high-level features to obtain the predicted PET image.

* * * * *